United States Patent [19]

Colquhoun et al.

[11] Patent Number: 5,025,260

[45] Date of Patent: Jun. 18, 1991

[54] MEASURING SYSTEM

[75] Inventors: Alexander Colquhoun, Heilbronn-Frankenbach; Klaus Berchtold, Heilbronn, both of Fed. Rep. of Germany

[73] Assignee: Telefunken electronic GmbH, Heilbronn, Fed. Rep. of Germany

[21] Appl. No.: 368,544

[22] Filed: Jun. 20, 1989

[30] Foreign Application Priority Data

Jun. 23, 1988 [DE] Fed. Rep. of Germany ....... 3821216

[51] Int. Cl.$^5$ ............................................. G01S 13/08
[52] U.S. Cl. ..................................... 342/127; 342/118
[58] Field of Search ............... 342/127, 120, 123, 124, 342/118

[56] References Cited

U.S. PATENT DOCUMENTS

| | | | |
|---|---|---|---|
| 3,680,092 | 7/1972 | Scott | 342/85 |
| 3,778,160 | 12/1973 | Wolcott | 356/5 |
| 3,860,925 | 1/1975 | Darbover, Jr. | 342/109 |
| 3,889,261 | 6/1975 | Sirven | 342/127 |
| 3,908,190 | 9/1975 | Nathan et al. | 342/118 |
| 4,238,795 | 12/1980 | Schiek et al. | 342/127 |
| 4,297,701 | 10/1981 | Henriques | 342/42 |
| 4,453,825 | 6/1984 | Buck et al. | 342/127 X |
| 4,468,959 | 9/1984 | Roberts | 367/99 |
| 4,509,049 | 4/1985 | Haendel et al. | 342/87 |
| 4,588,992 | 5/1986 | Clark | 342/123 |
| 4,730,190 | 3/1988 | Win et al. | 342/118 |
| 4,766,436 | 8/1988 | Crepin et al. | 342/122 |
| 4,804,961 | 2/1989 | Hane | 342/125 |
| 4,806,935 | 2/1989 | Fosket et al. | 342/120 |
| 4,829,305 | 5/1989 | LaBudde | 342/127 |
| 4,851,851 | 7/1989 | Hane | 342/112 |
| 4,851,852 | 7/1989 | Bjorke et al. | 342/120 |

*Primary Examiner*—John B. Sotomayor
*Attorney, Agent, or Firm*—Spencer & Frank

[57] ABSTRACT

The invention relates to a measuring system having a measuring array comprising a transmission and reception section and an electronic evaluation unit. In accordance with the invention, the distance between a first point and a second point is determined by moving the measuring array between the two points using the Doppler effect, with an intermediate frequency being formed in the transmission and reception section from the transmission frequency of the signal emitted by the transmission section and from the reception frequency of the signal reflected off a fixed object and picked up in the reception section, and the number of periods of intermediate frequency generated during the measuring operation being counted in the electronic evaluation unit to derive the distance.

23 Claims, 2 Drawing Sheets

MEASURING SYSTEM

BACKGROUND OF THE INVENTION

The invention relates to a measuring system having a measuring array comprising a transmission and reception section and an electronic evaluation unit.

The use of the Doppler effect to determine the velocity of a moving object on the basis of the measured Doppler shift and the derivation of the distance travelled by means of integration is a well known technique. An appropriate measuring array would require a complicated construction and could therefore only be produced with high manufacturing costs.

SUMMARY OF THE INVENTION

The object of the invention is to indicate a measuring system having a measuring array of the type mentioned at the outset for measuring distances that is simple in construction, inexpensive to manufacture, and easy to handle.

The object is attained in accordance with the invention by providing a measuring system having a measuring array comprising a transmission and reception section and an electronic evaluation unit, wherein the distance between a first point and a second point is determined by moving the measuring array between the points, utilizing the Doppler effect, with an intermediate frequency being formed in the transmission and reception section from the transmission frequency of the signal emitted by the transmission and reception section and from the reception frequency of the signal reflected off a fixed object and picked up in the transmission and reception section, and wherein the distance is derived from the number of periods of the intermediate frequency generated during the measuring operation in the electronic evaluation unit. The measuring system on which this measuring array in accordance with the invention is based permits not only simple construction of the array, but also simple implementation of the measurement operation by moving the array along the distance to be measured with the measurement result being independent of the movement velocity of the array.

Advantageous embodiments of the invention can be found in the sub-claims.

BRIEF DESCRIPTION OF THE DRAWINGS

The invention will now be described in greater detail, with reference to the drawings, in which.

DESCRIPTION OF THE PREFERRED EMBODIMENTS

Figure 1:
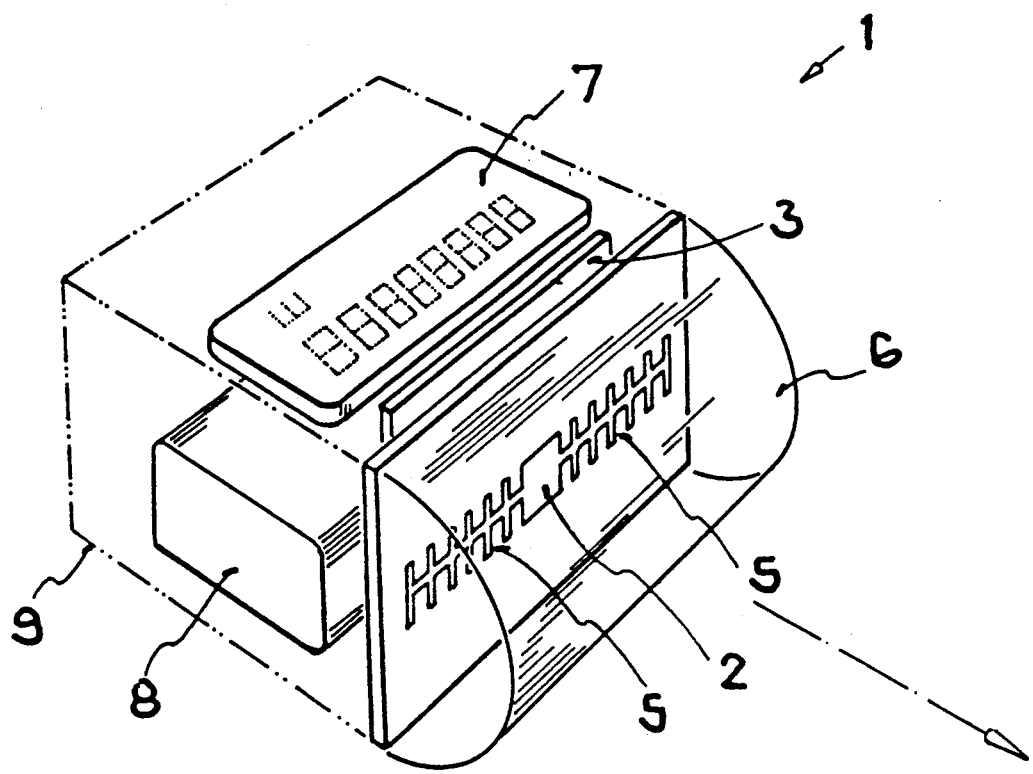
FIG. 1 shows in perspective a measuring array in accordance with the invention.

The measuring array according to FIG. 1 has an antenna system 4 arranged on the front of a rectangular and flat housing element 9 and comprising a planar antenna 5 mounted on a support and a dielectric lens 6. The transmission and reception section 2 arranged in the same plane as planar antenna 5 is connected to the antenna via a strip line and designed as a GaAs-MMIC (Monolithic Microwave Integrated Circuit). Behind planar antenna 5 in housing 9, an electronic evaluation unit 3 designed as an integrated Si circuit is accommodated on a printed circuit board and is connected to display device 7 arranged on the top of housing 9. Finally, a power supply unit 8 is also accommodated in housing 9.

Figure 3:
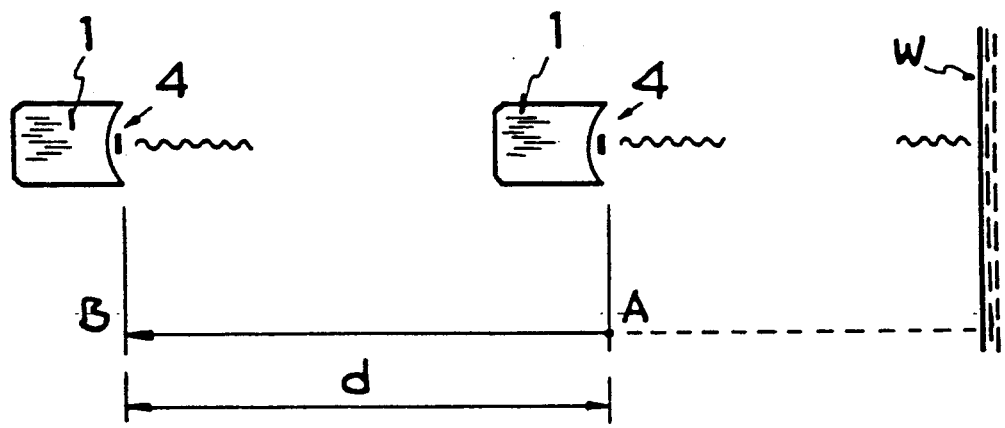
FIG. 3 shows a schematic representation of the measuring operation.

This measuring array is suitable for measurement distances from 0 to several 100m using the Doppler effect with microwave radiation at a transmission frequency of 100 GHz, for example. For this purpose, the measuring array 1 is moved between points A and B in order to measure the distance between these two points A and B in accordance with FIG. 3, with the signals emitted from antenna system 4 during this motion being reflected with a transmission frequency of $f_1$ off the fixed wall W back to antenna system 4, so that the reception frequency $f_2$ can be computed according to the following formula on the basis of the Doppler shift:

$$f_2 = f_1 / \left(1 - \frac{2v}{c}\right) \tag{1}$$

where $f_1$ is the transmission frequency, v the velocity of the moving array and c the light speed.

The transmission frequency $f_1$ and the reception frequency $f_2$ give the intermediate frequency $f_{ZF}$ with the aid of the equation (1):

$$f_{ZF} = f_2 - f_1 = f_1 \cdot 2v/c \cdot \frac{1}{(1 - 2v/c)}, \tag{2}$$

for $v \ll c$ equation (2) gives:

$$f_{ZF} = f_1 \cdot \frac{2v}{c}. \tag{3}$$

The measurement distance between the two points A and B with the length d is covered at the velocity v in the time $t_1$:

$$d = v \cdot t_1. \tag{4}$$

The equations (3) and (4) give for the intermediate frequency $f_{ZP}$:

$$f_{ZF} = f_1 \cdot \frac{2d}{t_1 c}. \tag{5}$$

Figure 4A:
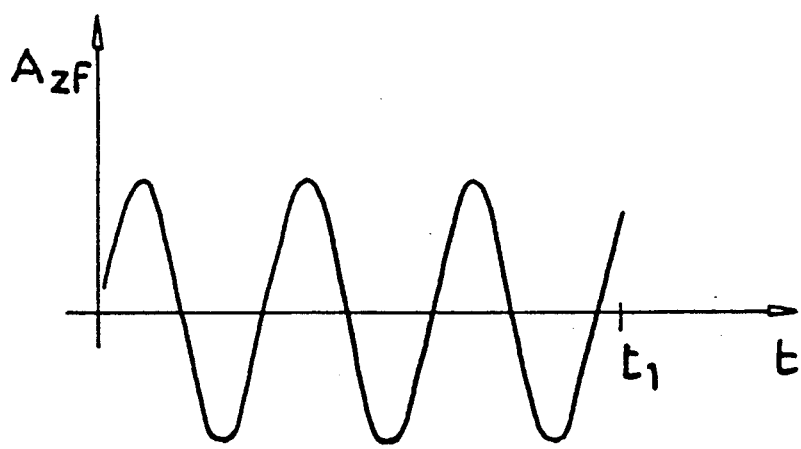
FIGS. 4a and 4b show the variation of the intermediate frequency signal during the measurement period.
Figure 4B:
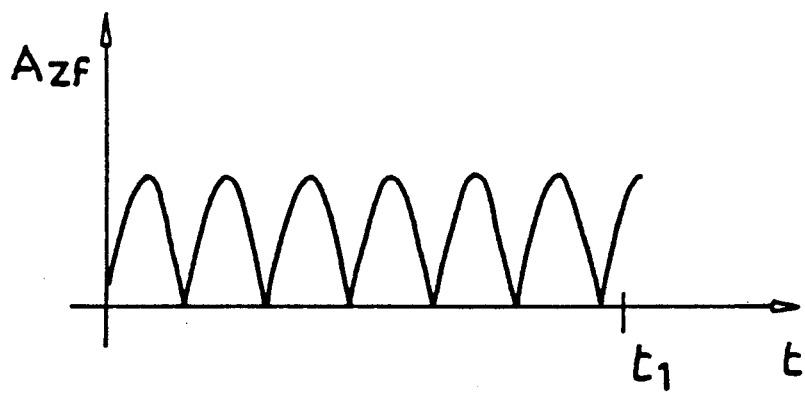

The number N of the periods of the frequency $f_{ZF}$, of the intermediate frequency signal generated during the time $t_1$ in accordance with FIG. 4a is obtained with the aid of equation (5) as $$N = f_{ZF} \cdot t_1 = f_1 \cdot \frac{2d}{c}, \tag{6a}$$

or, for the number $N'$ of a half-periods of rectified intermediate frequency $f_{ZP}$ of a rectified intermediate frequency signal according to FIG. 4b:

$$N' = f_1 \cdot \frac{2d}{c}. \tag{6b}$$

By rearranging the two equations (6a) and (6b) the result obtained for the distance d between the two points A and B is:

$$d = N \cdot \frac{c}{2f_1}, \text{ or} \qquad (7a)$$

$$d = N \cdot \frac{c}{4f_1}. \qquad (7b)$$

This result does not depend on the velocity v and the time $t_1$, meaning that it is immaterial bow quickly the measuring array is moved along the measurement distance between the two points A and B, since the distance covered is always determined by the number of periods or half-periods in accordance with equations (7a) and (7b) respectively.

Figure 2:
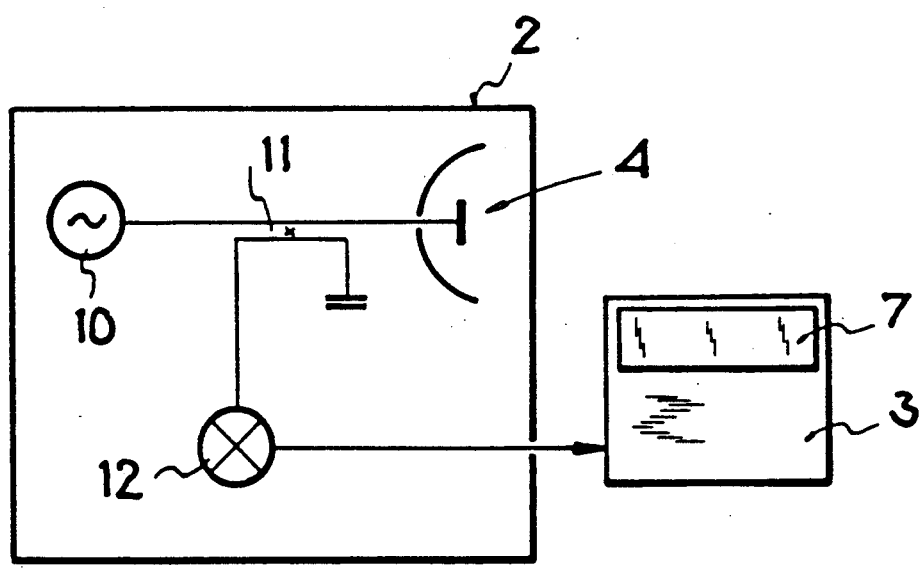
FIG. 2 shows a block diagram of the measuring array in accordance with the invention in FIG. 1.

In accordance with FIG. 2, transmission and reception section 2 comprises a dielectrically stabilized oscillator 10 designed on a MESFET basis and rated for an output power of approx. 10 mW. It is also possible to use Gunn or IMPATT diodes as the oscillator element. This oscillator 10 serves as the transmitter and as local oscillator (LO) for mixer stage 12. The oscillator signal with a frequency of 100 GHz is passed to antenna system 4, while the LO and reception signals are passed via a hybrid ring coupler 11 to the mixer stage 12 designed as a Schottky diode mixer. The output signal of mixer stage 12 passes to electronic evaluation unit 3, with the result of the evaluation being displayed in the display unit 7 of the latter.

With a transmission frequency $f_1$ of 100 GHz each period of intermediate frequency $f_{ZF}$ corresponds to a distance d of approx. 3 mm, whereas this value is halved after rectification of the intermediate frequency $f_{ZF}$, thereby permitting an improvement in the measurement accuracy.

The number of periods of intermediate frequency $f_{ZF}$ generated during the measuring operation corresponds exactly to the number of maximum values of the intermediate frequency signal, permitting in simple manner a pulse counter containing electronic evaluation unit 3 to be used for counting the maximum values. The distance d is derived from the number of maximum values using a microprocessor, which is also an integral part of electronic evaluation unit 3, in accordance with the relationship to equation (6a) or (6a), and displayed in the display unit (7).

The antenna system 4 can, as shown in FIG. 1, be designed as a combination of a planar antenna 5 and a dielectric lens 6. In addition, the antenna system 4 can comprise solely planar antennae or a combination of planar antenna with a horn antenna.

What is claimed is:

1. A measuring system for measuring a distance between first and second points, comprising:
    a transmission and reception section having transmitting, receiving and detecting means for transmitting a first signal with a predetermined transmission frequency so as to be reflected off of a fixed object during a movement of the transmission and reception section from a first point to a second point, and concurrently with the transmission of the first signal, receiving and detecting a frequency of the reflected signal;
    means, responsive to the reflected signal received by said transmitting, receiving and detecting means, for producing a second signal having a frequency which is based on a difference between the predetermined frequency and the detected frequency of the reflected signal, the difference resulting from a Doppler effect on the detected frequency of the reflected signal caused by the movement of the transmission and reception section; and
    an evaluation unit including
        means for counting a total number of periods of the second signal from a time when the transmission and reception section leaves the first point until a time when the transmission and reception section arrives at the second point, and
        means for calculating the distance based on the counted total number.

2. A measuring system as in claim 1, wherein the frequency of the second signal is equal to the difference between the predetermined frequency and the detected frequency, and the distance is equal to the counted total number multiplied by the speed of light divided by twice the predetermined frequency, said means for calculating comprising means for multiplying the counted total number by the speed of light divided by the predetermined frequency to obtain the distance.

3. A measuring system according to claim 2, wherein peak values of the second signal are counted to determine the number (N) of periods.

4. A measuring system according to claim 2, wherein the evaluation unit has a pulse counter for counting peak values of the second signal.

5. A measuring according to claim 4, wherein the evaluation unit has a microprocessor in order to derive the distance (d) from the number (N) of (maximum) peak values in accordance with the relationship $d = N \cdot (c/2f_1)$ wherein c is the speed of light and $f_1$ is the predetermined frequency.

6. A measuring system according to claim 1, wherein the transmission and reception section is an integrated GaAs circuit.

7. A measuring system according to claim 1, wherein the evaluation unit is an integrated Si circuit.

8. A measuring system according to claim 1, wherein the transmission and reception section has an antenna system.

9. A measuring system according to claim 8, wherein the antenna system comprises a planar antenna.

10. A measuring system according to claim 8, wherein the antenna system comprises a combination of a planar antenna and a dielectric lens or a horn antenna.

11. A measuring system according to claim 1, wherein the transmission and reception section operates in the 100 GHZ range.

12. A measuring system as in claim 1, wherein the frequency of the second signal is equal to the difference between the predetermined frequency and the detected frequency, said means for counting comprising means for counting half-periods of the second signal, the distance being equal to the counted total number of half periods multiplied by the speed of light divided by four times the predetermined frequency, said means for calculating comprising means for multiplying the counted total number by the speed of light divided by four times the predetermined frequency.

13. A measuring system as in claim 12, further comprising means for rectifying said second signal, said means for counting comprising means for counting peak values of the rectified second signal.

14. A measuring system according to claim 13, wherein the evaluation unit has a pulse counter for counting the peak values.

15. A measuring system according to claim 14, wherein the evaluation unit has a microprocessor in order to derive the distance (d) from the number (N') of maximum values in accordance with the relationship $d = N' \cdot (c/4f_1)$ where c is the speed of light and $f_1$ is the predetermined frequency.

16. A measuring system as in claim 1, wherein said transmitting, receiving and detecting means comprises means for transmitting the first signal in a first direction parallel to a straight line path between the first and second points, and receiving the reflected signal in a second direction opposite the first direction.

17. A method for measuring a distance between first and second points, comprising:

moving a transmission and reception section from the first point to the second point;

during all movement of the transmission section from the first point to the second point during said step of moving, transmitting a first signal with a predetermined transmission frequency so as to be reflected off of a fixed object;

concurrently with the transmission of the first signal during said step of transmitting, receiving and detecting a frequency of the reflected signal;

producing a second signal having a frequency which is based on a difference between the predetermined frequency and the detected frequency of the reflected signal, the difference resulting from a Doppler effect on the detected frequency of the reflected signal based by the movement of the transmission and reception section;

counting a total number of periods of the second signal from a time when the transmitting and receiving section leaves the first point until a time when the transmitting and receiving system arrives at the second point; and calculating the distance based of the counted total number.

18. A method as in claim 17, wherein said step of producing the second signal includes producing the second signal with a frequency equal to the difference between the predetermined frequency and the detected frequency and said step of calculating comprising the step of multiplying the counted total number by the speed of light divided by twice the predetermined frequency to obtain the distance.

19. A method as in claim 18, wherein said step of counting comprises the step of counting peak values of the second signal.

20. A method as in claim 17, wherein said step of producing the second signal includes producing the second signal to have a frequency equal to the difference between the predetermined frequency and the detected frequency, said step of counting comprises the step of counting half-periods of the second signal, and said step of calculating comprises the step of multiplying the counted total number of half-periods by the speed of light divided by four times the predetermined frequency to obtain the distance.

21. A method as in claim 20, further comprising the step of rectifying the second signal, and said step of counting comprises the step of counting peak values of the rectified second signal.

22. A method as in claim 17, wherein said step of transmitting includes the step of transmitting the first signal in a first direction parallel to a straight line path between the first and second points, and said step of receiving comprises the step of receiving the reflected signal in a second direction opposite the first direction.

23. A method as in claim 17, wherein the object is located outside of a straight line path from the first point to the second point, at a location along a straight line extension of the straight line path.

* * * * *